United States Patent [19]

Bull

[11] Patent Number: 4,743,381

[45] Date of Patent: May 10, 1988

[54] PROCESS FOR OXIDIZING A CYANIDE COMPOUND

[75] Inventor: Randy A. Bull, Hopewell, N.J.

[73] Assignee: FMC Corporation, Philadelphia, Pa.

[21] Appl. No.: 68,371

[22] Filed: Jul. 1, 1987

[51] Int. Cl.$^4$ ................................................ C02F 1/58
[52] U.S. Cl. ..................................... 210/759; 210/763; 210/904
[58] Field of Search .................. 210/759, 763, 904

[56] References Cited

U.S. PATENT DOCUMENTS

| | | | |
|---|---|---|---|
| 3,510,424 | 5/1970 | Zumbrunn | 210/759 |
| 3,617,567 | 11/1971 | Mathre | 210/904 X |
| 3,970,554 | 7/1976 | Fischer et al. | 210/759 X |
| 4,070,281 | 1/1978 | Tagashira et al. | 210/904 X |
| 4,370,241 | 1/1983 | Junkermann et al. | 210/759 |
| 4,417,987 | 11/1983 | Harrison | 210/759 |
| 4,549,969 | 10/1985 | Gerlach et al. | 210/759 |

FOREIGN PATENT DOCUMENTS

| | | | |
|---|---|---|---|
| 2141529 | 2/1973 | Fed. Rep. of Germany | 210/904 |
| 51-6359 | 1/1976 | Japan | 210/759 |
| 52-23860 | 2/1977 | Japan | 210/759 |
| 58-34083 | 2/1983 | Japan | 210/759 |
| 58-51982 | 3/1983 | Japan | 210/759 |

*Primary Examiner*—Tom Wyse
*Attorney, Agent, or Firm*—Richard E. Elden; Robert L. Andersen; Eugene G. Seems

[57] ABSTRACT

A process is provided for detoxifying an aqueous solution containing a cyanide by employing hydrogen peroxide in the presence of a solid catalyst. The solid catalyst comprises a transition metal supported on an aluminum oxide and/or silicon oxide base.

4 Claims, No Drawings

PROCESS FOR OXIDIZING A CYANIDE COMPOUND

A process is provided for oxidizing a cyanide compound in an aqueous medium by incorporating hydrogen peroxide and a solid catalyst into the aqueous medium.

In particular, the present invention is a process for oxidizing cyanide compounds to compounds which either are easily removed or are environmentally acceptable. The process does not require removing the cyanide compound from the solution.

Cyanides form HCN gas at a low pH which is very toxic. Aqueous wastes containing a cyanide compound cannot be discharged into the environment without preliminary treatment because of their extreme toxicity.

Hydrogen peroxide would be ideal for oxidizing cyanide compounds to a less toxic form because it does not leave toxic residues if used in excess. However, prior processes employing hydrogen peroxide are not generally suitable because they require either a homogeneous and frequently toxic catalyst or severe chemical conditions. For example, it is usually necessary to employ soluble toxic catalysts or a pH>8 or both, necessitating subsequent treatment of the aqueous medium prior to discharge into the environment.

U.S. Pat. No. 3,510,424 to Zumbrunn discloses that prior processes are undesirable as they require precipitating the cyanide as a solid compound or oxidizing the cyanide with active chlorine. Similarly, Zumbrunn discloses oxidation with hydrogen peroxide is also undesirable because the process requires a soluble catalyst copper which is toxic and must be disposed of. Instead, the patent teaches a process employing peroxyacid such as peroxydisulfuric acid or peroxymonosulfuric acid. However, such peroxyacids are expensive and the sulfate adds to the dissolved solids in the effluent.

U.S. Pat. No. 3,617,567 to Mathre teaches that an aqueous solution of cyanide may be oxidized by employing 0.8 or more mols of hydrogen peroxide per mol of cyanide, adjusting the solution to at least pH 8.3 but less than pH 11, and employing 5 to 1000 mg/l of a soluble catalyst selected from the group consisting of silver, tungsten and vanadium and copper, with soluble copper compounds (cupric or cuprous) being the most preferred. The catalyst copper is maintained in solution as the soluble cyano or amine complex. The high pH of the effluent from this process and the presence of soluble toxic catalysts make treatment prior to discharge of the cyanide-free solution necessary, but expensive.

U.S. Pat. No. 3,970,554 to Fischer et al. discloses that it has been recognized for a long time that hydrogen peroxide would be an ideal oxidizing agent for cyanides. However, the high pH required and the need for soluble, toxic catalysts such as copper, interfere with its commercial use. In addition, the patent teaches that copper is a strong decomposition catalyst for hydrogen peroxide. The patent teaches a process in which cyanide is oxidized optionally as the silver cyanide complex by hydrogen peroxide in the presence of an iodide ion or iodine. However, iodide salts and iodine and silver if used are very expensive and must be recovered for the process to be economical.

The present invention is a process for oxidizing a cyanide compound in an aqueous medium which overcomes the disadvantages of the prior processes comprising incorporating hydrogen peroxide into the aqueous medium and contacting the medium with a solid catalyst, the catalyst comprising a transition metal selected from the group consisting of silver, copper and nickel on a metal oxide base having a surface area of at least 10 square meters per gram, said metal oxide being selected from the group consisting of aluminum oxide and silicon oxide and mixtures thereof.

The catalyst must have a substantial surface area to provide sufficient transition metal centers available to the aqueous medium containing hydrogen peroxide. This surface area can be provided by amorphous or crystalline metal oxides such as, aluminum oxide, silicon oxide and aluminosilicates. An amorphous silica gel with no intentionally added alumina as well as a crystalline zeolite can be effective as a base for the transition metal. Preferably the base may be a molecular sieve material which term as used herein includes silica polymorphs known as silicalite, F-silicalite and TEA-silicalite as well as conventional zeolites such as, zeolite X, zeolite Y, mordenite, the ZSM family of zeolites and the like.

Any transition metal which is known to be effective as a homogeneous catalyst for the reaction may be employed on a metal oxide base including copper, silver and nickel.

It is particularly unexpected that a transition metal supported on a metal oxide base would be effective in catalyzing the oxidation of a cyanide compound by hydrogen peroxide in view of Mochida et al., "Transition Metal Ions on Molecular Sieves. II. Catalytic Activities of Transition Metal Ions on Molecular Sieves for the Decomposition of Hydrogen Peroxide," *The Journal of Physical Chemistry*, Vol. 78, No. 16, 1974, pages 1653–1657. This reference discloses that the decomposition catalytic activity of transition metal ions in solution was enhanced on exchanging the ions onto a zeolite Y molecular sieve and that nickel, copper and silver on zeolites are among the most active peroxygen decomposition catalysts. This reference also discloses that it is impossible to predict the effect of a hydrogen peroxide decomposition catalyst of a transition metal supported on a zeolite from the catalytic effect of the transition metal ions in solution. One would expect that a decomposition catalyst for hydrogen peroxide would be very inefficient as an oxidation catalyst. Unexpectedly, it has been found that the most active hydrogen peroxide decomposition catalysts preferentially catalyze the oxidation of cyanides with hydrogen peroxide.

Any method of introducing metal catalysts onto the solid base will result in a suitable catalyst. Preferable methods are those involving ion exchange or adsorption of the metal ions from a solution. However, other methods would also be suitable such as incorporation of the metal into the base by crystallization or during preparation of a base such as alumina, zeolites and the like. Metals may also be introduced during use as a result of metal ions present in a waste or process stream such as from a metal plating process.

Process parameters for operating the present invention may be varied over a wide range. The pH may range from 4 to 12, however, at a pH of less than about 7, HCN gas may be formed which must be confined. The catalysts show activity at ambient temperatures and require no additional heat. However, in some cases elevated temperatures will be desirable to shorten the required treatment time. The upper practical temperature limit will be the boiling point of the aqueous waste stream and the lower practical limit the freezing point.

Preferable temperature ranges are 10° C. to 80° C. to prevent long reaction times and to prevent excessive hydrogen peroxide decomposition, respectively. It would be most preferred to operate this process between 15° C. and 70° C.

The quantity of catalyst required for treatment will depend upon the pollutant, the flow rate of the waste stream (or time required for pollutant removal), the reaction temperature to be used and the concentration of metal on the solid support. Specific reaction parameters may be readily selected by reference to the general operation conditions set forth above.

The concentration of the hydrogen peroxide added to the aqueous solution can be between 5% and 70% by weight, preferably between 30% and 50% for safety and handling purposes. The method of introduction can be continuous or batch. It can be introduced prior to or during contact of the waste stream with the catalyst. Hydrogen peroxide may also be added at various points within the catalyst bed provided that at some point both the waste stream and the hydrogen peroxide are simultaneously in contact with the catalyst.

The amount of hydrogen peroxide used in the process depends on the quantity of cyanide compound to be oxidized. The ratio of hydrogen peroxide to cyanide compound employed for this process will be the least amount of hydrogen peroxide required to reduce the concentration of the cyanide compound to the required level. This will be dependent upon other operating parameters, but will preferably not exceed the stoichiometric requirement. Higher temperatures may cause more hydrogen peroxide to be used due to hydrogen peroxide decomposition.

The best mode for practising the process will be clear to one skilled in the art from the following nonlimiting examples.

EXAMPLES

A solution of the pollutant of the desired concentration in deionized water was prepared and the pH adjusted to the desired value with NaOH or $H_2SO_4$. The hydrogen peroxide was added, followed by pH readjustment if necessary, and the catalyst was added to the solution to commence the reaction. Aliquots were taken periodically for analysis.

Analysis—Analyses of initial and residual pollutant were carried out using titrimetric, colorimetric or potentiometric procedures. Occasionally analyses were duplicated by two methods to insure accuracy.

Catalyst Preparation—The catalyst bases were either washed with 0.02M NaOH to obtain the sodium form or were purchased as the sodium form.

Metal ion exchanges were carried out by agitating 50 g of the zeolite used as a support in 100 mL of a 10 to 20 mM solution of metal ion at 50° C. for 15 minutes to 1 hour. The solution was decanted and the solid washed well with water and dried at 110° C.

EXAMPLES 1-5

The conditions and results for Examples 1-5 are presented as Table I. Table I presents data which illustrates the effectiveness of the present process for cyanide detoxification with hydrogen peroxide. Examples 1-5 show that copper and silver supported on zeolites are very good catalysts at ambient temperatures, showing better reactivity than soluble copper and silver catalysts of U.S. Pat. No. 3,617,567, which require 40° C.-50° C. Nickel/Y had little effect. Examples A and B are control examples using noncatalytic Na/Y and no added solid, respectively. These control examples show that catalysts are necessary for cyanide detoxification over a one-hour time period.

TABLE I

| DETOXIFICATION OF 190-200 mg/L CYANIDE SOLUTIONS | | | |
|---|---|---|---|
| Example | Catalyst | Final Cyanide, mg/L | % Removal |
| 1 | Cu/Zeolite Y | 50 | 74 |
| 2 | Cu/Zeolite X | 75 | 62 |
| 3 | Ag/Zeolite Y | 10 | 95 |
| 4 | Ag/Zeolite X | 15 | 92 |
| 5 | Ni/Zeolite Y | 150 | 21 |
| A | Na/Zeolite Y | 150 | 21 |
| B | None | 175 | 7 |

Conditions:
Hydrogen peroxide = 245 ppm
pH = 10.5
Ambient temperature = 20°-22° C.
Reaction time = 1 hour

I claim:

1. A process for oxidizing a cyanide ion in an aqueous medium comprising incorporating hydrogen peroxide into the aqueous medium and contacting the medium with a solid catalyst, the catalyst comprising a transition metal selected from the group consisting of silver, copper and nickel on a metal oxide base having a surface area of at least 10 square meters per gram, said metal oxide being selected from the group consisting of aluminum oxide and silicon oxide and mixtures thereof.

2. The process of claim 1 wherein the transition metal is silver.

3. The process of claim 1 wherein the transition metal is copper.

4. The process of claim 1 wherein the transition metal is nickel.

* * * * *